(12) United States Patent
Newman et al.

(10) Patent No.: US 10,749,156 B2
(45) Date of Patent: Aug. 18, 2020

(54) BATTERY MODULE STRUCTURAL INTEGRATION

(71) Applicant: NIO USA, INC., San Jose, CA (US)

(72) Inventors: Austin L. Newman, San Jose, CA (US); Joshua Smith, Los Gatos, CA (US)

(73) Assignee: NIO USA, Inc., San Jose, CA (US)

( * ) Notice: Subject to any disclaimer, the term of this patent is extended or adjusted under 35 U.S.C. 154(b) by 55 days.

(21) Appl. No.: 15/253,250

(22) Filed: Aug. 31, 2016

(65) Prior Publication Data

US 2018/0034023 A1 Feb. 1, 2018

Related U.S. Application Data

(60) Provisional application No. 62/369,738, filed on Aug. 1, 2016, provisional application No. 62/369,736, filed on Aug. 1, 2016.

(51) Int. Cl.
 *H01M 2/10* (2006.01)

(52) U.S. Cl.
 CPC ........ *H01M 2/1077* (2013.01); *H01M 2/105* (2013.01); *H01M 2/1055* (2013.01); *H01M 2/1061* (2013.01); *H01M 2/1094* (2013.01); *H01M 2220/20* (2013.01)

(58) Field of Classification Search
 CPC ... H01M 2/1077; H01M 2/105; H01M 2/1061
 See application file for complete search history.

(56) References Cited

U.S. PATENT DOCUMENTS

| 4,137,376 A | 1/1979 | Clegg et al. |
| 4,174,014 A * | 11/1979 | Bjorksten ............... B60K 1/04 180/68.5 |
| 5,015,545 A | 5/1991 | Brooks |
| 8,069,912 B2 | 12/2011 | Campagna et al. |
| 2009/0305125 A1 | 12/2009 | Kosugi et al. |
| 2010/0136404 A1* | 6/2010 | Hermann ............ H01M 2/1016 429/120 |
| 2011/0052968 A1 | 3/2011 | Venkataramani et al. |
| 2012/0043935 A1* | 2/2012 | Dyer ....................... B60L 1/003 320/109 |
| 2013/0183566 A1* | 7/2013 | Wayne .................. H01M 2/105 429/120 |
| 2014/0045037 A1 | 2/2014 | Nishikawa et al. |
| 2015/0120094 A1 | 4/2015 | Kimchi et al. |
| 2015/0221914 A1* | 8/2015 | Page ................... H01M 2/1016 429/82 |

OTHER PUBLICATIONS

U.S. Appl. No. 15/252,941, filed Aug. 31, 2016, Newman et al.

(Continued)

*Primary Examiner* — Helen Oi K Conley
(74) *Attorney, Agent, or Firm* — Sheridan Ross P.C.

(57) ABSTRACT

A battery including supporting material is disclosed. The battery comprises a plurality of modules, each of which further comprises a plurality of battery cells that store and discharge electrical energy. To support the battery modules, a supporting material such as foam is inserted in the space between the battery modules. To support the cells within the modules, a supporting material such as foam is also inserted in between the battery cells in each of the modules.

16 Claims, 4 Drawing Sheets

(56) References Cited

OTHER PUBLICATIONS

International Search Report and Written Opinion for International (PCT) Patent Application No. PCT/US2017/044869, dated Oct. 18, 2017, 8 pages.
Official Action for U.S. Appl. No. 15/252,941, dated May 11, 2018 13 pages.
Final Action for U.S. Appl. No. 15/252,941, dated Sep. 19, 2018 13 pages.
Final Action for U.S. Appl. No. 15/252,941, dated Sep. 19, 2018 12 pages.
Official Action for U.S. Appl. No. 15/252,941, dated Dec. 31, 2018 13 pages.
Final Action for U.S. Appl. No. 15/252,941, dated Jul. 5, 2019 11 pages.

* cited by examiner

BATTERY MODULE STRUCTURAL INTEGRATION

CROSS REFERENCE TO RELATED APPLICATIONS

This application claims the benefit both of U.S. Provisional Patent Application No. 62/369,736, filed Aug. 1, 2016, and U.S. Provisional Patent Application No. 62/369,738, filed Aug. 1, 2016, both of which are incorporated by reference as if fully set forth.

FIELD OF INVENTION

This application is related to batteries for electric vehicles, and, more specifically, to battery cell structural integration.

BACKGROUND

An autonomous car is a vehicle that is capable of sensing its environment and navigating without human input. Numerous companies and research organizations have developed working prototype autonomous vehicles.

Many electrical autonomous cars exist. Electrical cars are cars that use a supply of electrical energy, rather than an internal combustion engine, for powering the car. Typically, electrical cars are powered by batteries that are rechargeable. There have been rapid advancements in electrical vehicle batteries in recent years but further advancements are desirable.

SUMMARY

A battery pack is disclosed. The battery pack includes a battery pack enclosure, a plurality of battery modules included in the battery pack module, and supporting material between the modules within the battery pack enclosure. The battery modules include a plurality of battery cells and a battery module enclosure.

An autonomous vehicle is also disclosed. The autonomous vehicle includes vehicle components and a battery pack powering at least some of the vehicle components. The battery pack includes a battery pack enclosure, a plurality of battery modules included in the battery pack module, and supporting material between the modules within the battery pack enclosure. The battery modules include a plurality of battery cells and a battery module enclosure.

A battery module is also disclosed. The battery module occupies space defined by supporting material of a battery pack. The battery module includes a battery module enclosure, a plurality of battery cells within the battery module enclosure, and the supporting material surrounding the battery module enclosure.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE DRAWINGS

A battery including supporting material is disclosed. The battery comprises a plurality of modules, each of which further comprises a plurality of battery cells that store and discharge electrical energy. To support the battery modules, a supporting material such as foam is inserted in the space between the battery modules. To support the cells within the modules, a supporting material such as foam is also inserted in between the battery cells in each of the modules. In addition to providing structural strength to the parts of the battery, the structural material can also provide thermal insulation.

Figure 1:
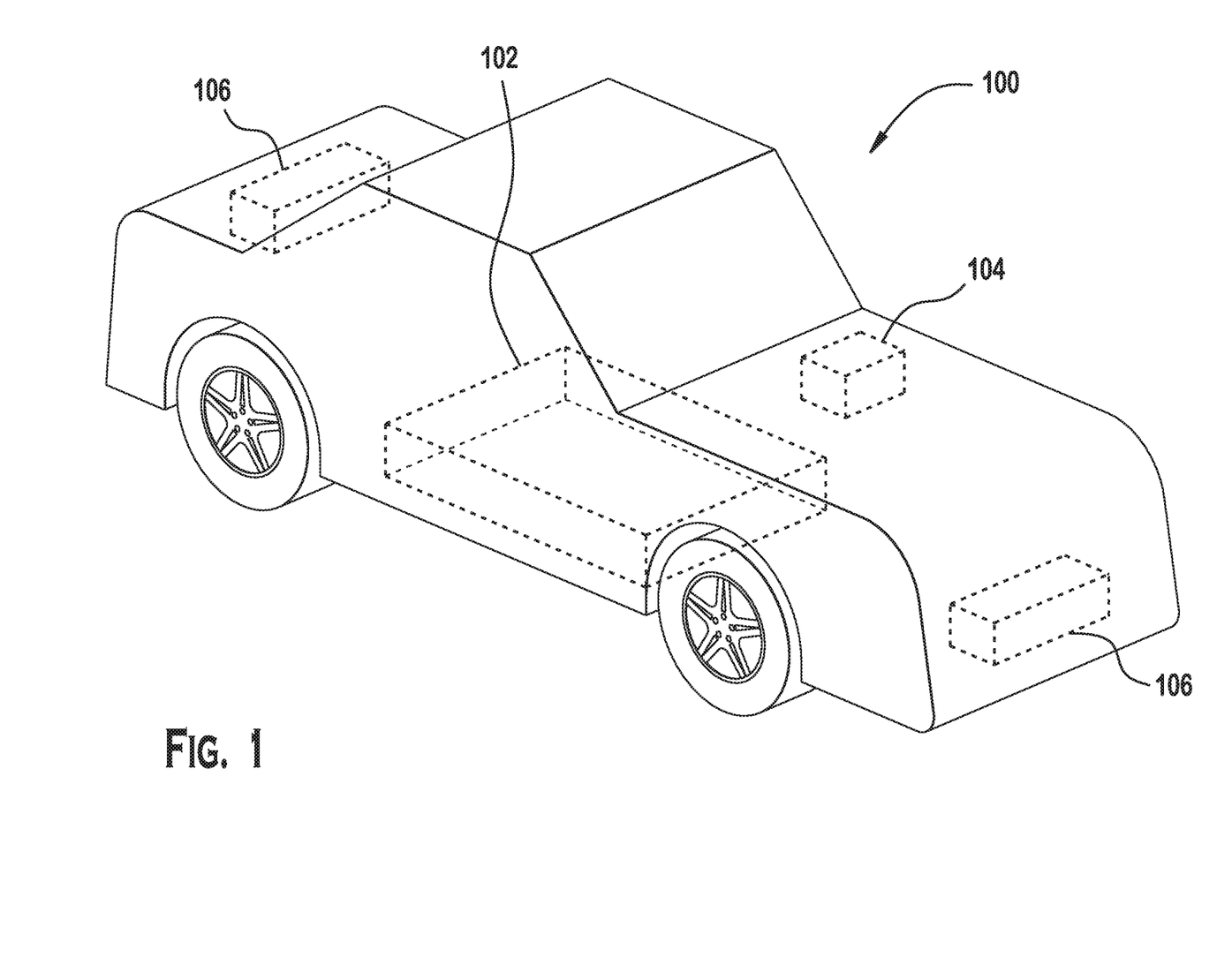
FIG. 1 is an illustration of an electric vehicle, according to an example.

FIG. 1 is an illustration of an electric vehicle 100, according to an example. As shown, the vehicle includes a battery pack 102. The electric vehicle 100 also includes other vehicle components not shown, including typical components for electronic vehicles such as a motor, steering components, passenger comfort electronics, driver controls, signaling, and the like. The battery pack 102 stores energy and provides electrical power to the various components of the vehicle 100 on demand, including to the motor in order to provide power to propel the vehicle 100.

The vehicle 100 also includes an on-board computer 104 and sensors 106. Although shown in particular locations, the sensors 106 may be located anywhere on the vehicle 100. The on-board computer 104 provides various data-processing operations for the vehicle 100, including autonomously piloting the vehicle 100. The on-board computer 104 may include various components for performing such functionality, such as a hardware microprocessor, memory, storage (e.g., non-volatile), input devices (including sensors 106), output devices (including outputs provided to operate various systems of the vehicle 100), and other components typically included in an autonomous vehicle. The sensors may include various sensors for detecting aspects of the environment of the vehicle 100 for performing the autonomous driving functions, such as radar devices, cameras, sound sensing devices, and other technically feasible devices for obtaining inputs for autonomous piloting of the vehicle 100.

Autonomously piloting the vehicle may include autonomously controlling acceleration, steering, and braking, as well as other functions. These functions may be performed by processing inputs received from input devices (sensors 106) based on algorithms stored by or accessible to the on-board computer 104.

Figure 2:
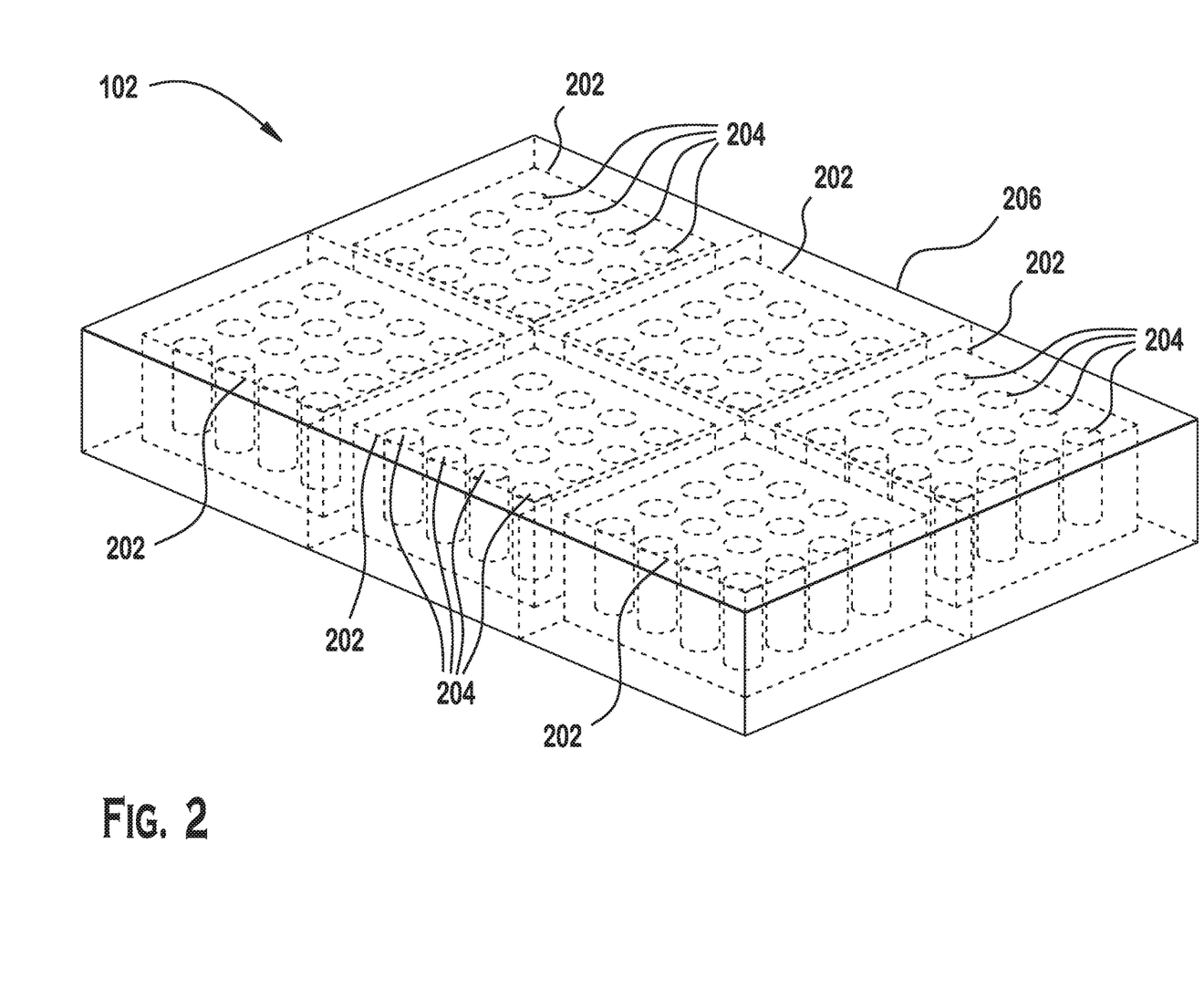
FIG. 2 illustrates additional details of the battery pack illustrated in FIG. 1, according to an example.

FIG. 2 illustrates additional details of the battery pack 102 illustrated in FIG. 1, according to an example. As shown, the battery pack is divided into modules 202. Modules 202 are groupings of cells 204 that physically group and electrically connect the cells (e.g., in parallel and/or in series) into a cohesive unit. The cells 204 each include energy storage materials that store chemical energy and convert that chemical energy into electrical energy. The cells 204 in a module 202 are connected together in parallel and/or in series to satisfy specific electrical requirements of the vehicle 100.

Each module 202 may include a single external connection for electrical access to the collection of cells 204 within the module 202. Multiple modules 202 are included in the battery pack 102 and are coupled together electrically in order to satisfy particular electrical requirements (e.g., current requirements, voltage requirements, power requirements, or the like) of the vehicle 100. The contents of the battery pack 102 are held within and protected by an enclosure 206.

Figure 3:
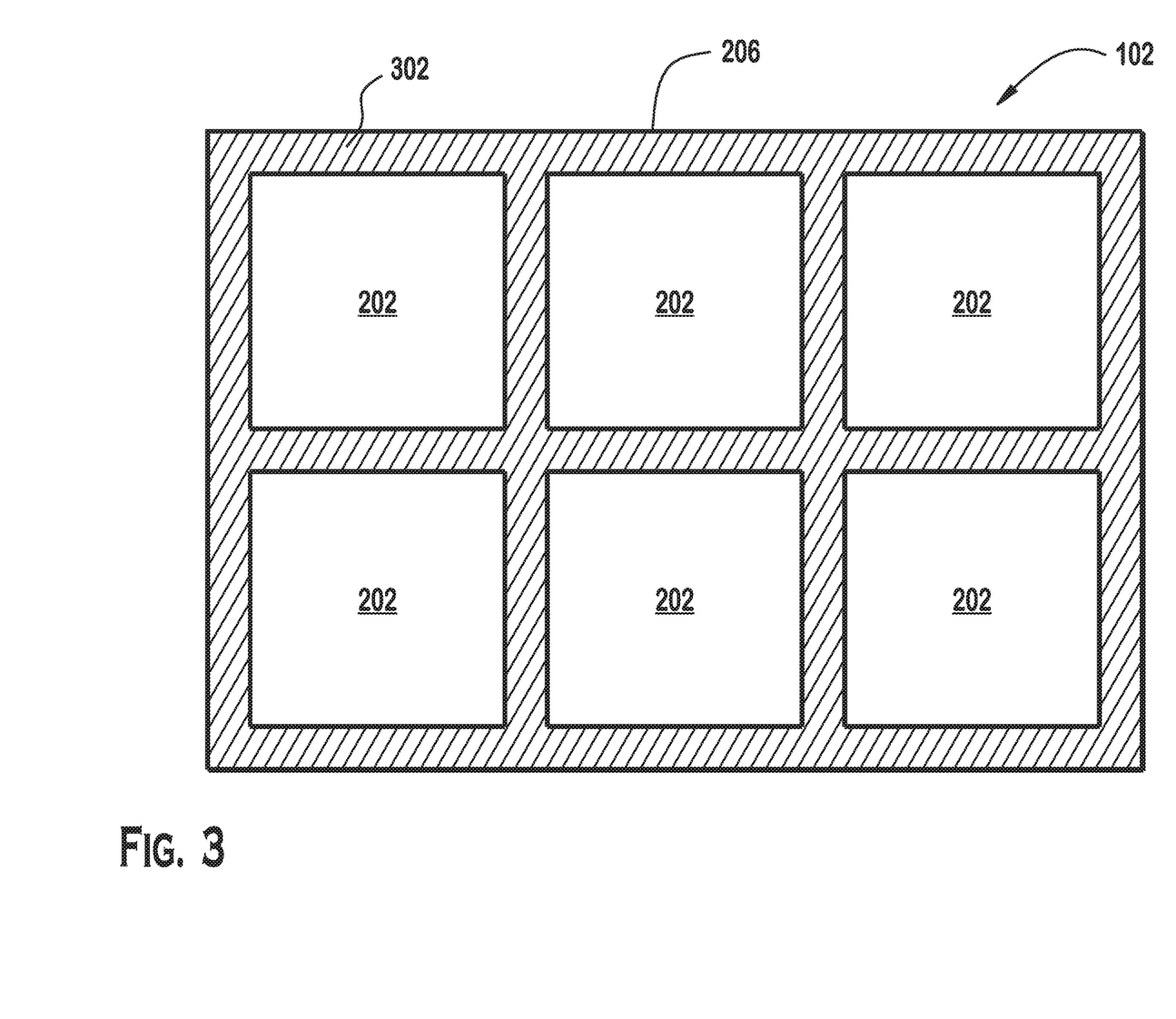
FIG. 3 is a top-down, open view of the battery pack of FIG. 1, according to an example.

FIG. 3 is a top-down, open view of the battery pack 102 of FIG. 1, according to an example. A top wall (or lid) of the battery pack 102 is not shown so that the inside of the battery pack 102 can be seen in FIG. 3. As shown, the battery pack 102 includes six modules 202 organized in rows. Although shown as being arranged in a specific configuration and with specific shapes, the modules 202 may be of any technically feasible shape arranged in any technically feasible manner.

A supporting material 302 is present in the space between the modules 202. The supporting material 302 can be any material that has light weight and that absorbs mechanical energy. One class of materials that meets these criteria is foam. Foams are materials that comprise solid or liquid material having pockets of gas trapped therein. Some examples of types of foams that could be used as the supporting material 302 include a polymer-based foam (such as a polyurethane foam) and aluminum foam. Another material that could also be used as the supporting material 302 is a non-Newtonian fluid, or, more specifically, a shear thickening fluid. Properties of a shear thickening fluid are that viscosity of such a fluid increases with the rate of shear strain. Such a fluid would "firm up" when a strong force is applied, thereby helping to protect the modules 202 and cells 204 in the event that strong forces are applied to the battery pack 102. The supporting material 302 fills substantially all of the space within the enclosure 206, including space above, below, and around each of the modules 202.

The supporting material 302 spreads mechanical forces throughout the battery pack 102. This force spreading function helps to spread certain forces to all of the modules 202 instead of having such forces focus on specific modules 202. For example, in the event of an impact, the force of the impact is spread, through the supporting material 302, to more of the modules 202 than if the supporting material 302 were not present.

Additionally, vehicles, such as vehicle 100, are typically subjected to legally required collision tests. The inclusion of supporting material 302 in the battery pack 102 allows the battery pack 102 to withstand a larger force than if the supporting material 302 were not included. Alternatively, the inclusion of supporting material 302 allows for a smaller amount of "structural material" to be included within the battery pack 102 and still be able to withstand the same impact force. Structural material includes material such as the enclosure 206 wall and the walls of the cells 204. These walls can be thinner than if supporting material 302 were not used.

Compartments for each of the modules 202 may be defined by structural walls within the enclosure 206. Alternatively, structural walls may be absent, with the supporting material 302 serving as the structural walls.

During manufacturing of the battery pack 102, the technique for inserting the supporting material 302 depends on the specific material used for the supporting material 302. Some types of foam may be injected as liquid into the space in which the supporting material 302 is to exist. For example, liquid material can be injected and then hardens to form polyurethane foam. A non-Newtonian fluid may also be used. Such fluid can simply be injected into the space for the supporting material 302. For metal foam, such as aluminum foam, the metal foam is pre-formed to include cavities for the modules 202 and the modules are placed into those spaces.

Figure 4:
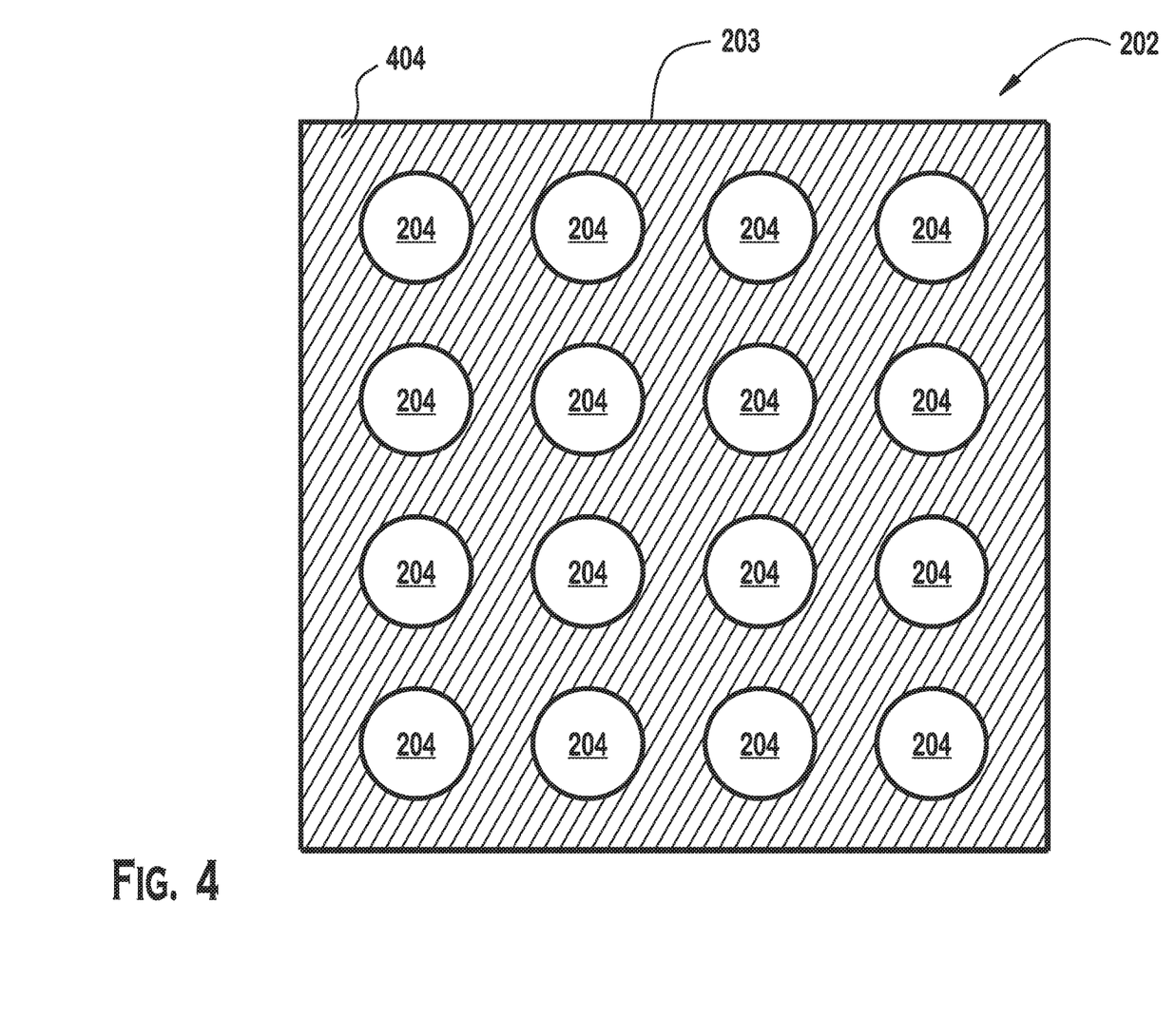
FIG. 4 is a top-down view of one of the modules of FIGS. 1-3, according to an example.

FIG. 4 is a top-down view of one of the modules 202 of FIGS. 1-3, according to an example. A top wall of the module 202 is not shown so that supporting material 404 can be visible. As shown, the module 202 includes a module enclosure 203 enclosing a plurality of cells 204. Other components not shown in FIG. 4 include various electronics for controlling how power is provided from the cells 204 of the battery.

Supporting material 404 occupies the space between the cells 204 of the module 202. As with the supporting material 302 of FIG. 3, the supporting material 404 of FIG. 4 is a material that has low weight and a high ability to absorb energy, such as a foam, a non-Newtonian fluid, or another material. The specific foam material used for the supporting material 404 can be the same as the material used as the supporting material 302 between the modules 202 or can be different.

The cells 204 can be any technically feasible shape. For example, the cells 204 can be cylindrical, "prismatic" (i.e., rectangular shapes), or pouches (e.g., a thin, flat sheet in a vacuum formed aluminum packaging). The cells 204 may be rechargeable, and can be charged via a connection to an external power supply. Each cell 204 stores energy that can be converted to electrical energy through terminals. The cells may be any technically feasible battery cell type. In one example, the cells 204 are lithium ion cells. The battery pack 102 may include management electronics and sensors to manage the cells 204. For example, the management electronics may manage temperature, charging, current flow, and the like, for the cells 204.

During manufacturing, the technique for inserting the supporting material 404 in between the cells 204 depends on the specific material used for the supporting material 404. For a foam formed from a material that starts as a liquid, the starting liquid can be injected into the module 202. The liquid is then converted to the foam material, thereby causing a foam material to occupy substantially all of the space between the cells 204 in the module 202. For a metallic foam material, the metallic foam is first cast into a shape that can hold the cells 204 and then the cells 204 are placed into the metallic foam material. Further, if a metallic foam or other metallic material is used, insulation may be required to prevent portions of the cells 204 from shorting to each other. Cells 204 may be placed in dielectric sleeves or the aluminum foam can be potted in an epoxy that is dielectric.

In some embodiments, structural material is only present in the modules 202, between the cells 204, but not between the modules 202 in the battery pack 102. In other embodiments, structural material is only present between the modules 202 in the battery pack 102, but not between the cells 204 in the modules 202. In yet other embodiments, structural material is present between the modules in the battery pack 102 and between the cells 204 in the modules 202. The structural material serves to mechanically "link" the various components of the battery pack 102 together, effectively increasing the structural strength of the battery pack 102. By joining the various components of the battery pack 102 together in such a manner, forces applied to any portion of the battery pack 102 are spread throughout the battery pack 102 and are not concentrated at the location at which the force is applied. This reduces the intensity of force experienced at that location, since the force is spread among more components.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

It should be understood that many variations are possible based on the disclosure herein. Although features and elements are described above in particular combinations, each feature or element may be used alone without the other features and elements or in various combinations with or without other features and elements.

What is claimed is:

1. A battery pack, comprising:
a battery pack enclosure;
a plurality of battery modules arranged inside the battery pack enclosure, wherein each battery module of the plurality of battery modules arranged inside the battery pack enclosure comprises:
  a plurality of battery cells; and
  a battery module enclosure, wherein each battery cell of the plurality of battery cells is arranged inside the battery module enclosure; and
a metal foam material disposed in spaces inside the battery pack enclosure and outside a periphery of each battery module enclosure, and wherein the metal foam material is disposed between adjacent battery module enclosures of the plurality of battery modules arranged inside the battery pack enclosure,
  wherein the metal foam material contacts all outer sidewalls of the plurality of battery cells, all inner sidewalls of the plurality of battery module enclosure, all outer sidewalls of the plurality of battery module enclosures, and all inner sidewalls of the battery pack enclosure,
  wherein the metal foam material occupies substantially all spaces between the plurality of battery cells such that the metal foam material is continuous along the all outer side walls of the plurality of battery cells,
  wherein the metal foam material occupies substantially all spaces between the plurality of battery modules such that the metal foam material is continuous along the all outer side walls of the plurality of battery modules, and
  wherein the metal foam material occupies substantially all spaces between the plurality of battery modules and the battery pack enclosure such that the metal foam material is continuous along the all inner sidewalls of the battery pack enclosure.

2. The battery pack of claim 1, wherein:
the plurality of battery cells in each battery module enclosure are enclosed by walls of each battery module enclosure, and
the metal foam material contacts at least four of the walls of each battery module enclosure.

3. The battery pack of claim 1, wherein each battery module is a rectangular shaped structure having six walls that enclose the plurality of battery cells.

4. The battery pack of claim 1, wherein:
the battery modules of the plurality of battery modules are coupled together either or both of in parallel or in series.

5. The battery pack of claim 1, wherein:
the battery cells have one of a cylindrical shape, a prismatic shape, and a pouch shape.

6. The battery pack of claim 1, wherein:
the plurality of battery cells of each battery module are coupled together either or both of in parallel or in series.

7. An autonomous vehicle, comprising:
vehicle components capable of sensing an environment of the autonomous vehicle and navigating without human input; and
a battery pack powering at least some of the vehicle components, the battery pack comprising:
  a battery pack enclosure;
  a plurality of battery modules arranged inside the battery pack enclosure, wherein each battery module of the plurality of battery modules arranged inside the battery pack enclosure comprises:
    a plurality of battery cells; and
    a battery module enclosure, wherein each battery cell of the plurality of battery cells is arranged inside the battery module enclosure and enclosed by walls of the battery module enclosure; and
  a metal foam material disposed in spaces inside the battery pack enclosure and outside a periphery of the walls of each battery module enclosure,
    wherein the metal foam material is disposed between adjacent battery module enclosures of the plurality of battery modules arranged inside the battery pack enclosure,
    wherein the metal foam material contacts all outer sidewalls of the plurality of battery cells, all inner sidewalls of the plurality of battery module enclosures, all outer sidewalls of the plurality of battery module enclosures, and all inner sidewalls of the battery pack enclosure,
    wherein the metal foam material occupies substantially all spaces between the plurality of battery cells such that the metal foam material is continuous along the all outer side walls of the plurality of battery cells,
    wherein the metal foam material occupies substantially all spaces between the plurality of battery modules such that the metal foam material is continuous along the all outer side walls of the plurality of battery modules, and
    wherein the metal foam material occupies substantially all spaces between the plurality of battery modules and the battery pack enclosure such that the foam material is continuous along the all inner sidewalls of the battery pack enclosure.

8. The autonomous vehicle of claim 7, wherein:
the metal foam material contacts sidewalls of the walls of each battery module enclosure.

9. The autonomous vehicle of claim 7, wherein:
the battery modules of the plurality of battery modules are coupled together either or both of in parallel or in series.

10. The autonomous vehicle of claim 7, wherein:
each battery cell of the plurality of battery cells have one of a cylindrical shape, a prismatic shape, and a pouch shape.

11. The autonomous vehicle of claim 7, wherein:
the plurality of battery cells of each battery module are coupled together either or both of in parallel or in series.

12. A battery module occupying space defined by an energy absorbing metal foam material of a battery pack, the battery module comprising:
a battery module enclosure; and
a plurality of battery cells arranged inside a periphery of the battery module enclosure;
wherein the energy absorbing metal foam material is disposed outside of and completely surrounds the periphery of the battery module enclosure,
wherein the energy absorbing metal foam material contacts all outer sidewalls of the plurality of battery cells, all inner sidewalls of the battery module enclosure, all outer sidewalls of a plurality of battery modules, and all outer sidewalls of the battery module enclosure,
wherein the energy absorbing metal foam material occupies substantially all spaces between the plurality of battery cells such that the energy absorbing metal foam material is continuous along the all outer side walls of the plurality of battery cells,
wherein the energy absorbing metal foam material occupies substantially all spaces between the plurality of battery modules such that the energy absorbing metal foam material is continuous along the all outer side walls of the plurality of battery modules, and
wherein the energy absorbing metal foam material occupies substantially all spaces between the plurality of battery modules and a battery pack enclosure such that the energy absorbing metal foam material is continuous along thea inner sidewalls of the battery pack enclosure.

13. The battery module of claim 12, wherein:
the battery module is coupled to at least one other battery either in parallel or in series.

14. The battery module of claim 12, wherein:
each battery cell of the plurality of battery cells have one of a cylindrical shape, a prismatic shape, and a pouch shape.

15. The battery module of claim 12, wherein:
the plurality of battery cells are coupled together either or both of in parallel or in series.

16. The battery pack of claim 7, wherein each battery module is a rectangular shaped structure that encloses the plurality of battery cells.

* * * * *

UNITED STATES PATENT AND TRADEMARK OFFICE
CERTIFICATE OF CORRECTION

PATENT NO. : 10,749,156 B2
APPLICATION NO. : 15/253250
DATED : August 18, 2020
INVENTOR(S) : Austin Newman et al.

It is certified that error appears in the above-identified patent and that said Letters Patent is hereby corrected as shown below:

In the Claims

Claim 1, Column 5, Lines 41-42, delete "enclosure" and insert --enclosures-- therein.
Claim 12, Column 8, Line 8, delete "thea" and insert --all-- therein.

Signed and Sealed this
Twenty-ninth Day of September, 2020

Andrei Iancu
*Director of the United States Patent and Trademark Office*